United States Patent
Chang et al.

(10) Patent No.: US 10,313,788 B2
(45) Date of Patent: Jun. 4, 2019

(54) DETECTING SPEAKER FAULTS USING ACOUSTIC ECHOES

(71) Applicant: INTEL CORPORATION, Santa Clara, CA (US)

(72) Inventors: Stanley Chang, Hualien County (TW); Alan Yao, New Taipei (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/787,829

(22) Filed: Oct. 19, 2017

(65) Prior Publication Data

US 2019/0124443 A1    Apr. 25, 2019

(51) Int. Cl.

| *H04R 3/00* | (2006.01) |
|---|---|
| *H04R 29/00* | (2006.01) |
| *G08B 6/00* | (2006.01) |
| *G10L 21/0208* | (2013.01) |
| *G10L 21/0232* | (2013.01) |

(52) U.S. Cl.
CPC ............... *H04R 3/007* (2013.01); *G08B 6/00* (2013.01); *G10L 21/0232* (2013.01); *H04R 29/001* (2013.01); *G10L 2021/02082* (2013.01)

(58) Field of Classification Search
CPC ........ H04R 3/007; H04R 29/001; G08B 6/00; G10L 2021/02082
See application file for complete search history.

(56) References Cited

U.S. PATENT DOCUMENTS

| 5,652,566 A * | 7/1997 | Lambert ................ G08B 29/10 |
| | | 340/506 |
| 2006/0251265 A1* | 11/2006 | Asada .................. H04R 29/001 |
| | | 381/58 |
| 2008/0048852 A1* | 2/2008 | Weston .................... G08B 3/10 |
| | | 340/521 |
| 2010/0085195 A1* | 4/2010 | Bennett .................. G08B 29/10 |
| | | 340/577 |
| 2010/0142716 A1* | 6/2010 | Lee ........................ H04R 27/00 |
| | | 381/57 |
| 2014/0254813 A1* | 9/2014 | Anderton .................. H04R 3/02 |
| | | 381/66 |
| 2014/0340215 A1* | 11/2014 | Piccolo, III ............ G08B 29/12 |
| | | 340/514 |
| 2015/0248832 A1* | 9/2015 | Piccolo, III .......... G08B 29/145 |
| | | 340/514 |
| 2017/0018168 A1* | 1/2017 | Beernink ................. G08B 7/06 |
| 2017/0289717 A1* | 10/2017 | Little .................... H04R 29/007 |

* cited by examiner

*Primary Examiner* — Sonia L Gay
(74) *Attorney, Agent, or Firm* — International IP Law Group, P.L.L.C.

(57) ABSTRACT

An example apparatus for detecting loudspeaker faults includes a switch detector to detect that a loudspeaker fault detection switch is enabled. The apparatus also includes an audio receiver to receive an echo energy threshold and audio from a microphone in a test area. The apparatus further includes an audio analyzer to detect that the echo energy threshold is not exceeded by an acoustic echo in the captured audio. The apparatus includes a fault generator to generate a loudspeaker fault in response to detecting the acoustic echo does not exceed the echo energy threshold.

23 Claims, 7 Drawing Sheets

DETECTING SPEAKER FAULTS USING ACOUSTIC ECHOES

BACKGROUND

Audio warning systems may use loudspeakers to provide audible warnings in various situations. For example, audible warnings may be used by audio warning systems in Functional Safety (FuSa) products of vehicles to prevent accidents.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, audible warnings can be used by audio warning systems of functional safety (FuSa) products to prevent accidents. For example, a lane departure warning system in a vehicle may produce audible warnings every time a vehicle changes lanes to ensure that a driver is aware of the lane change. However, one or more faults in the audio warning system may cause an audio warning to not be played correctly, if at all. For example, a speaker fault may prevent any sounds including audible warnings from being heard by the driver. Moreover, a damaged loudspeaker may cause distorted or muted sound. Thus, a driver may be prevented from hearing the audible warning due to one or more these possible faults.

The present disclosure relates generally to techniques for detecting speaker faults. Specifically, the techniques described herein include an apparatus, method and system for detecting speaker faults using acoustic echoes. An example apparatus includes a switch detector to detect an enabled loudspeaker fault detection switch. The apparatus includes an audio receiver to receive an echo energy threshold and audio from a microphone in a test area. The apparatus further includes an audio analyzer to detect that the echo energy threshold is not exceeded by an acoustic echo in the captured audio. The apparatus also includes a fault generator to generate a loudspeaker fault in response to detecting the acoustic echo does not exceed the echo energy threshold. In some examples, the apparatus can also further include a backup activator to activate a backup system in response to detecting the loudspeaker fault.

The techniques described herein thus enable faults to be detected in audio warning systems as early as possible. For example, the loudspeaker of an audio warning system may need to be replaced or serviced. Thus, the techniques may provide protection against loudspeaker faults in the "last mile" of an audio system before such a system is repaired. For example, the techniques described herein may be used to activate a backup warning system in response to detecting one or more faulty loudspeakers. In addition, the techniques described herein may enable automated periodic testing of audio warning systems. For example, the techniques described herein can be used to regularly test audio warning systems for one or more faults. The underlying causes of any detected faults can then be serviced or replaced.

Figure 1:
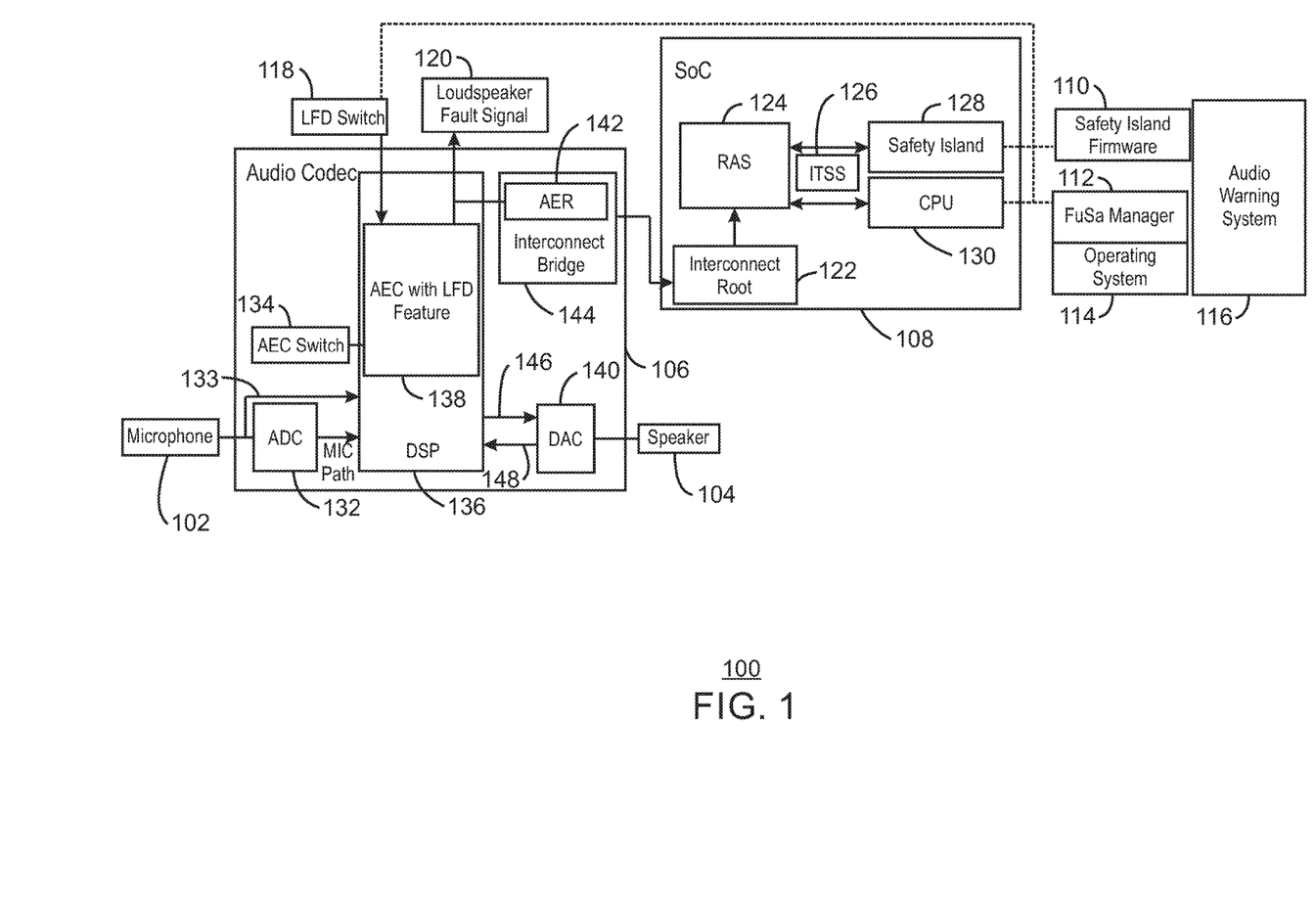
FIG. 1 is a block diagram illustrating an example system for detecting speaker faults using acoustic echoes.

FIG. 1 is a block diagram illustrating an example system for detecting speaker faults using acoustic echoes. The example system is referred to generally by the reference number 100 and can be implemented in the computing device 600 below in FIG. 6 using the method 400 of FIG. 4 below.

The example system 100 includes a microphone 102, a speaker 104, both communicatively coupled to an audio codec 106. The audio codec 106 is also communicatively coupled to a system-on-chip (SoC) 108. The SoC 108 is also communicatively coupled to a safety island firmware 110, a Functional Safety (FuSa) Manager 112, an operating system (OS) 114, and an audio warning system 116. For example, the audio warning system 116 can configure and enable the loudspeaker fault detection (LFD) feature by Safety Island 128 via the Safety Island firmware 110 or by the CPU via the FuSa manager 112 over the OS 114. For example, the Safety Island 128 may be stand-alone dedicated processor that is configured to perform a functional safety check. The FuSa manager may be software included in the OS 114 that may perform functional safety functions. The audio codec 106 is further communicatively coupled to a LDF switch 118 that can be used to enable or disable an LDF feature. The audio codec 106 can output a loudspeaker fault signal 120. The SoC 108 includes an Interconnect Root 122. The Interconnect Root 122 is communicatively coupled to a Reliability, Availability, and Serviceability (RAS) logic 124. The RAS logic 124 is communicatively coupled to an Interrupt and Timer Sub-System (ITSS) 126. The ITSS 126 is communicatively coupled to a safety island 128 and a CPU 130. For example, the Safety Island 128 or CPU 130 can poll the RAS 124 to determine the LFD status, or can be notified by the ITSS 126 when the loudspeaker fault signal 120 is detected. The audio codec 106 includes an Analog-to-Digital Converter (ADC) 132 and an acoustic echo cancellation (AEC) switch 134 communicatively coupled to a digital signal processor (DSP) 136. The DSP 136 includes an AEC with a loudspeaker fault detection (LFD) feature 138. The audio codec 106 further includes a Digital-to-Analog (DAC) converter 140 communicatively coupled to the DSP 136 and the speaker 104. The audio codec 106 also further includes an Advanced Error Reporting (AER) module of an Interconnect bridge 144 of the audio codec 106. For example, the AEC can report the Loudspeaker Fault signal 120 to the SoC 108 via the AER 142. An arrow indicates a speaker path 146 to the DAC 140. Another arrow indicates a loopback 148 from the DAC 140. For example, the loopback 148 may be used to analyze audio being sent in the speaker path 146.

As shown in FIG. 1, an LFD switch 118 may be used to enable an LFD feature of an AEC with LFD feature 138. For example, the LFD switch 118 may enable the LFD feature in response to detecting an audible warning signal from a safety island firmware 110 or a FuSa Manager 112. The AEC with LFD feature 138 may turn on a microphone path in response to the LFD switch 118 being turned on. For example, the microphone path may include the ADC 132. The ADC 132 may convert analogue signals to digital signals. The AEC with LFD feature 138 may then receive audio via the microphone 102 and determine whether an echo from the loudspeaker 104 as captured by the microphone 102 is detected. In some examples, if the echo is not detected, then the AEC with LFD feature 138 may send a loudspeaker fault signal 120 to the FuSa Manager 112. If the echo is detected, then no loudspeaker fault signal 102 may be sent and the system may continue to perform the audible warning as normal.

In some examples, a loudness threshold, also referred to herein as an echo energy threshold, may be used to detect the echo. For example, if an echo is detected exceeding a loudness beyond the threshold, then the system may perform the audible warning. However, in some examples, if the echo does not exceed the loudness threshold, then the AEC with LFD feature 138 may generate the loudspeaker fault signal 120.

In some examples, the FuSa Manager 112 may enable a backup warning system in response to receiving the loudspeaker fault signal 120. In some examples, the FuSa Manager 112 may enable an automated driving correction feature. For example, the automated driving correction feature may be a lane departure correction feature or an automated application of brakes.

The diagram of FIG. 1 is not intended to indicate that the example system 100 is to include all of the components shown in FIG. 1. Rather, the example system 100 can be implemented using fewer or additional components not illustrated in FIG. 1 (e.g., additional logic, microphones, speakers, etc.).

Figure 2:
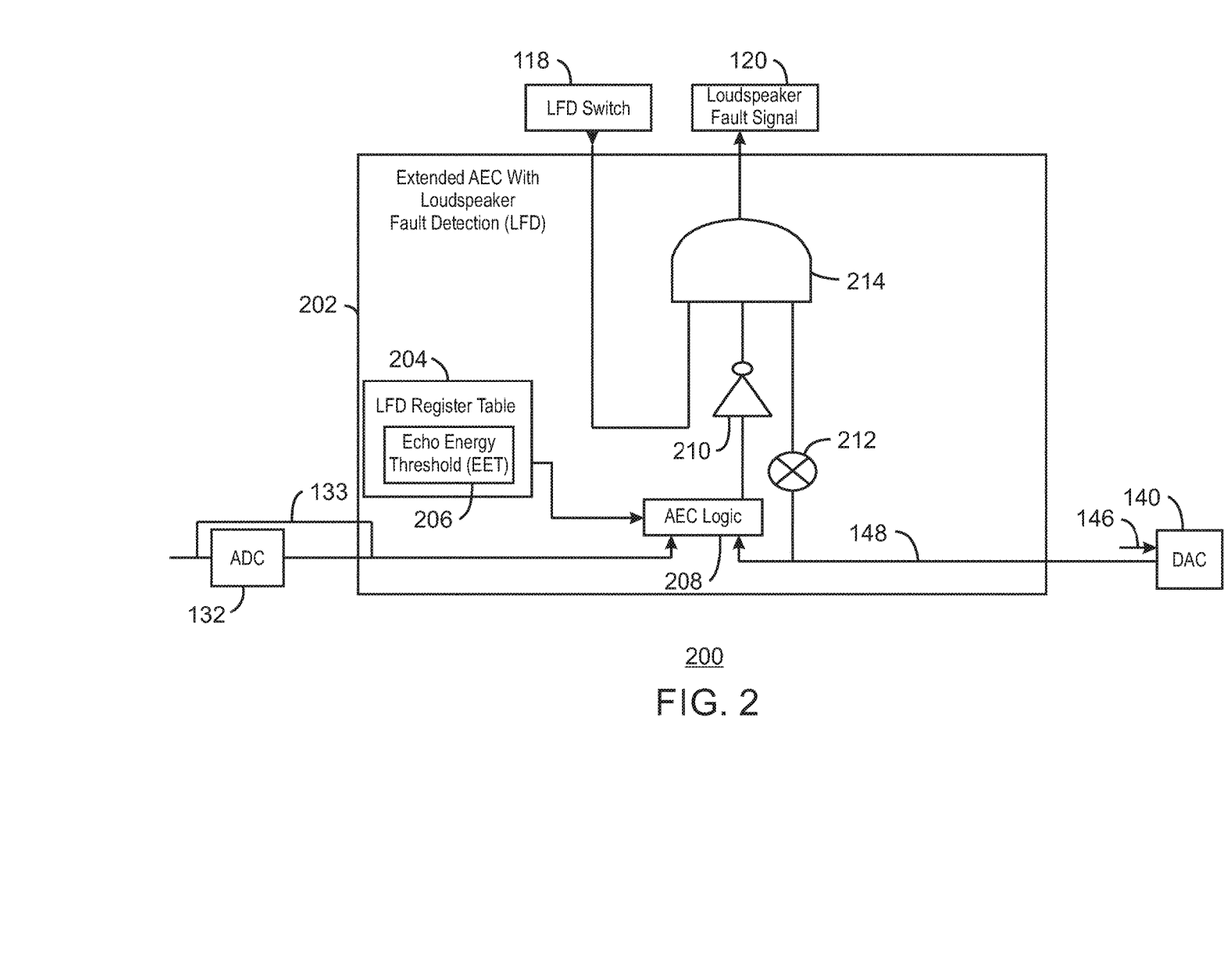
FIG. 2 is a block diagram illustrating an example apparatus that can detect speaker faults using acoustic echoes.

FIG. 2 is a diagram illustrating an example apparatus that can detect speaker faults using acoustic echoes. The example apparatus is generally referred to by the reference number 200 and can be implemented in the computing device 600 below. For example, the apparatus 200 can be implemented in the AEC with LFD feature 138 of the system 100 of FIG. 1, the speaker fault detector 628 of the computing device 600 of FIG. 6 below, or at least partially in the computer readable media 700 of FIG. 7 below.

The apparatus 200 of FIG. 2 includes similarly numbered elements described in FIG. 1 above. The apparatus 200 further includes an extended AEC with loudspeaker fault detection (LFD) 202. The extended AEC with loudspeaker fault detection (LFD) 202 includes an LFD Register Table 204. The LFD Register Table 204 includes an Echo Energy Threshold (EET) register 206. In some examples, the LFD register values, including the EET register 206, can be pre-defined and calibrated in factory based on the layout of a car's audio system, and updated in runtime by firmware update or according to different car usage scenarios. For example, when considering wind noise, the EET value for a car window opened may be higher than the value when the window is closed. The extended AEC with LFD 202 includes an AEC logic 208. The extended AEC with LFD 202 also includes an LFD switch 118, an inverter 210, and an output channel status 212, communicatively coupled as inputs into an AND gate 214. The output of the AND gate 214 may be a loudspeaker fault signal 120.

As shown in FIG. 2, the LDF switch 118 may be used to enable an LFD feature of the extended AEC with loudspeaker fault detection (LFD) 202. For example, since the AND gate 214 may output the loudspeaker fault signal 120 only if all inputs are set to 1, then the LFD switch may prevent any loudspeaker fault signal 120 from being generated by inputting a 0 into the AND gate 214 and thus disabling the LFD feature. In some examples, the LFD switch may be enabled, or set to a value of 1, in response to detecting an initiation of an audible warning system (not shown).

In some examples, the AEC logic 208 may detect an acoustic echo in audio received via the microphone path of the ADC 132 or the DMIC path 133. For example, the AEC logic 208 may compare a detected acoustic echo against an EET 206 and determine whether the acoustic echo exceeds an EET of the EET register 206. For example, the EET register 206 may set the EET to regulate the Echo Detected status as being true only when the energy of an acoustic echo is higher than the EET. In some examples, the EET may be based on the distance between the microphone and the speakers of an audio warning system. In some examples, the EET may therefore be preset by the manufacture based on the distance between the one or more microphones and speakers. In some examples, if the AEC logic 208 detects that the acoustic echo exceeds the EET set by the EET register 206, then the AEC logic 208 may output an echo detected signal to the inverter 210. For example, the output echo detected status signal of the AEC logic 208 may be a binary output, with a high value of 1 indicating the echo detected signal. In some examples, the Echo Detected status from AEC logic 208 may thus be a true or false signal to represent if an acoustic echo is detected by the AEC logic 208. The inverter 210 may then invert the value of the input signal from the AEC logic 208. For example, if the input signal into the inverter 210 is an echo detected value of 1, then the inverter may output a value of 0 into the AND gate 214. Thus, if the echo detected signal is output by the AEC logic 208, then the AND gate may not output the loudspeaker fault signal 120. In some examples, if the AEC logic 208 outputs a low value or 0 to the inverter 210, then the inverter 210 may instead output a high value, or 1, to the AND gate 214.

In some examples, if the LFD switch is enabled, and the echo detected signal is not output by the AEC logic 208, then the AND gate 214 may output a loudspeaker fault signal 120 if the output channel status 212 is enabled or set to 1. In some examples, the output channel energy may be summed to a true or false state, indicated by a 1 or 0, respectively. For example, the audio detected in loopback 148 may be converted into a binary format. In some examples, a true state or value of 1 may indicate that some sounds are being played thru the output channel and that the output channel thus contains audio. By contrast, a false state or value of 0 may indicate that the output channel is mute. In some examples, the output channel status 212 can be time synced with the AEC parameters. For example, the output channel status 212 can be synced with the detected acoustic echo. As one example, one or more shift registers can be used to delay the binary from loopback 148. In some examples, if the output channel status 212 is set to 0, then the AND gate 214 may not output the loudspeaker fault signal. Thus, the AND gate 214 may only output the loudspeaker 120 in response to detecting that the LFD switch 118 is enabled, that a 1 corresponding to a lack of detected echo is received from inverter 210, and that the output channel status is enabled or set to 1. An output loudspeaker fault signal 120 with a true state or value of 1 may thus indicate that a loudspeaker fault is detected. For example, the loudspeaker fault may indicate sound distortion, muted sound, or a sound that is too soft from one or more loudspeakers.

An example truth table of all possible LFD switch 118 states, echo detected states output from AEC logic 208, and output channel status 212 states with resulting loudspeaker fault signal 120 states is shown below in Table 1:

TABLE 1

Truth table of LFD mechanism

| LFD switch | Echo Detected Status | Output Channel Status | Loudspeaker Fault signal |
|---|---|---|---|
| Disabled | False | False | False |
| Enabled | False | False | False |
| Disabled | True | False | False |
| Enabled | True | False | False |
| Disabled | False | True | False |
| Enabled | False | True | True |
| Disabled | True | True | False |
| Enabled | True | True | False |

As shown in Table 1, the loudspeaker fault signal may be output, or true, when the LFD switch is enabled, the echo detected status is false, and the output channel status is true.

The diagram of FIG. 2 is not intended to indicate that the example apparatus 200 is to include all of the components shown in FIG. 2. Rather, the example apparatus 200 can be implemented using fewer or additional components not illustrated in FIG. 2 (e.g., additional logic, switches, gates, etc.).

Figure 3:
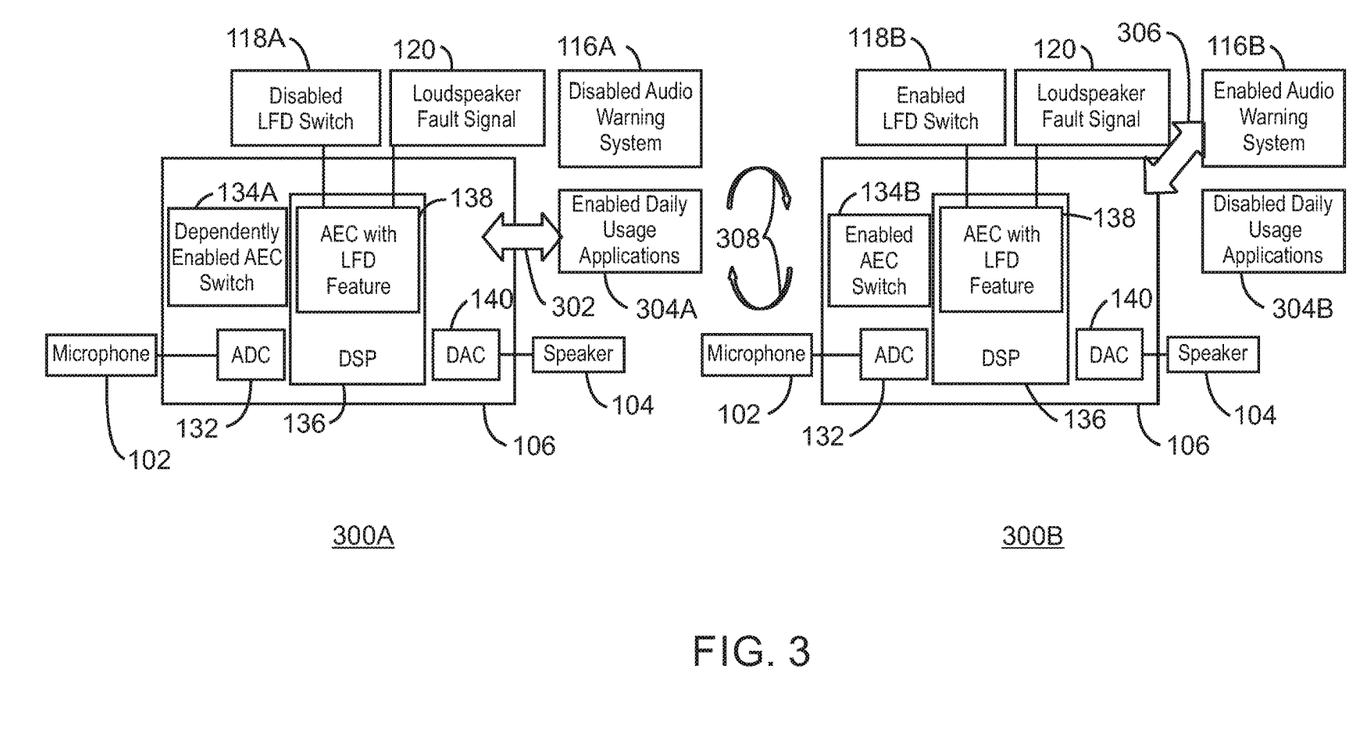
FIG. 3 is a block diagram illustrating an example system that can switch between two modes of operation.

FIG. 3 is a block diagram illustrating an example system that can switch between two modes of operation. The example modes of the system are referred to generally by the reference numbers 300A and 300B and can be implemented in the computing device 600 below in FIG. 6 using the methods 400 or 500 of FIGS. 4 and 5 below. FIG. 3 includes similarly numbered elements from FIG. 1.

As shown in FIG. 3, a first mode 300A of the system can be a daily usage mode 300A. The daily usage mode 300A includes a disabled LFD switch 118A and a disabled audio warning system 116A. The usage mode 300A also includes a dependently enabled AEC switch 134A. For example, the dependently enabled AEC switch 134A may be selectively enabled for audio echo cancellation. As indicated by an arrow 302, the daily usage mode 300A may enable one or more daily usage applications 304A. For example, the daily usage applications 304A may include auto echo cancellation, and Voice-over-Internet-Protocol (VoIP) applications, voiced GPS navigation, a media player, and radio functionality, among other applications. As shown in daily usage mode 300A, the audio warning system may be disabled 116A while the daily usage applications 304A are enabled.

A second mode of the system may be a loudspeaker fault detection mode 300B. As shown in FIG. 3, the loudspeaker fault detection mode 300B includes an enabled LFD switch 118B, an enabled audio warning system 116B, and an enabled AEC switch 134B. As shown by an arrow 306, the audio codec 106 may be coupled with and interact with an enabled audio warning system 116B in the loudspeaker fault detection mode 300B. For example, the audio warning system may be a lane departure warning system, or a fire detection system, among other types of audio warning systems. The audio codec 106 may not be concurrently applied to signals processed by the disabled daily use applications 304B in the loudspeaker fault detection mode 300B. However, as shown by arrow 308, the system can switch between the daily usage mode 300A and the loudspeaker fault detection mode 300B. For example, the system can switch between the two modes in response to the audio warning system being disabled 116A or enabled 116B. In some examples, the LFD switch may be disabled 118A or enabled 118B in response to the audio warning system being disabled 116A or enabled 116B, respectively.

The diagram of FIG. 3 is not intended to indicate that the example system 300 is to include all of the components shown in FIG. 3. Rather, the example system 300 can be implemented using fewer or additional components not illustrated in FIG. 3 (e.g., additional applications, switches, microphones, speakers, etc.).

Figure 4:
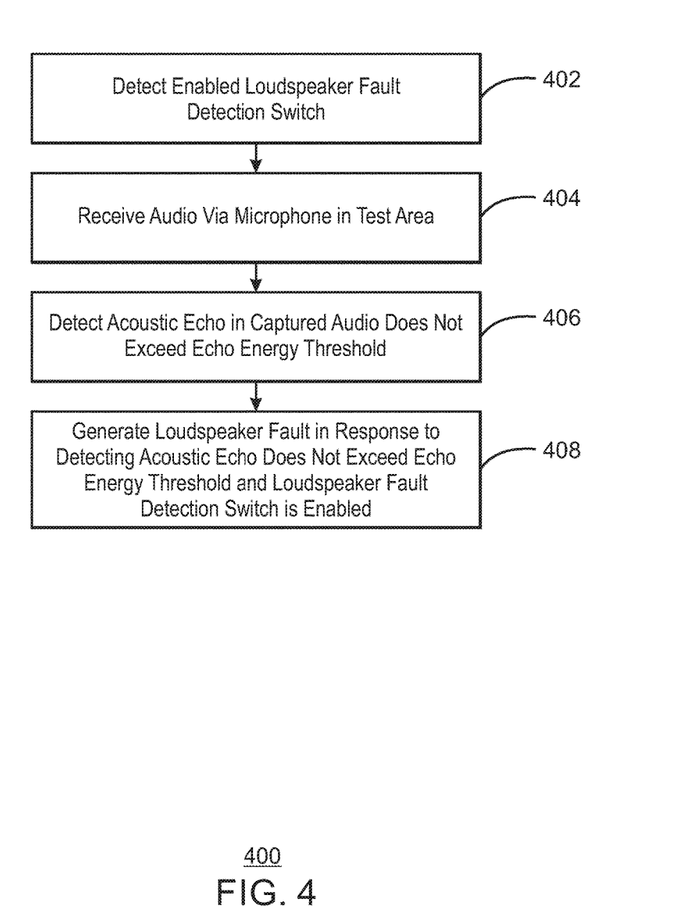
FIG. 4 is a flow chart illustrating a method for detecting a speaker fault.

FIG. 4 is a flow chart illustrating an example method for detecting a speaker fault. The example method is generally referred to by the reference number 400 and can be implemented in the AEC with LFD feature 138 of system 100 of FIG. 1 or the Extended AEC with LDF 202 of the apparatus 200 of FIG. 2 above or the speaker fault detector 628 of the computing device 600 below.

At block 402, a processor detects an enabled loudspeaker fault detection switch. For example, the loudspeaker fault detection switch may have been enabled in response to detecting an activation audible warning system to be tested. For example, an audible warning activation signal may be automatically generated by the audible warning system.

At block 404, the processor receives audio via a microphone in a test area. For example, the test area may include audio from a loudspeaker to be tested. In some examples, the processor can enable a microphone path of an audio codec before a loudspeaker is to play an audible warning. For example, the processor can enable the microphone path of an audio codec in response to detecting that the loudspeaker fault detection switch is enabled. The processor can then receive audio via the microphone path of the audio codec during the time that the audible warning is to be played.

At block 406, the processor detects an acoustic echo in the captured audio that does not exceed an echo energy threshold. For example, the echo energy threshold may be a volume level that an acoustic echo may exceed during normal use of an audible warning system. The echo energy threshold may be measured in decibels or as a percentage of an expected decibel level. For example, the echo energy threshold may be a predetermined percentage of an expected decibel level at a microphone. In some examples, the processor may detect a lack of an Echo Detected status from an AEC module. For example, the Echo Detected status may represent a detected acoustic echo that exceeds the echo energy threshold. In some examples, the processor can also detect that an output channel contains audio. For example, the output channel can be time synced with the detected acoustic echo.

At block 408, the processor generates a loudspeaker fault in response to detecting the acoustic echo does not exceed the echo energy threshold and the loudspeaker fault detection switch is enabled. For example, the acoustic echo may be below the echo energy threshold due to a failed speaker or a speaker failing due to being near end of life. In some examples, the processor may generate the loudspeaker fault in response to detecting that the acoustic echo does not exceed the echo energy threshold, that the loudspeaker fault detection switch is enabled, and that an output channel contains audio. For example, the audio in the output channel may be received from an audio loopback. In some examples, the processor can then activate a visual warning system or a haptic warning system in response to detecting the loudspeaker fault. In some examples, the processor can activate a backup response system in response to detecting the loudspeaker fault. For example, the backup response system may be an automated lane change system or an automated braking system.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation. For example, the processor may detect that the acoustic echo exceeds the echo energy threshold and not generate any loudspeaker fault. The processor may instead cause the audible warning to sound in response to detecting that the acoustic echo exceeds the echo energy threshold. In some examples, the processor may switch to a daily usage mode in response to detecting a disabled loudspeaker fault detection switch.

Figure 5:
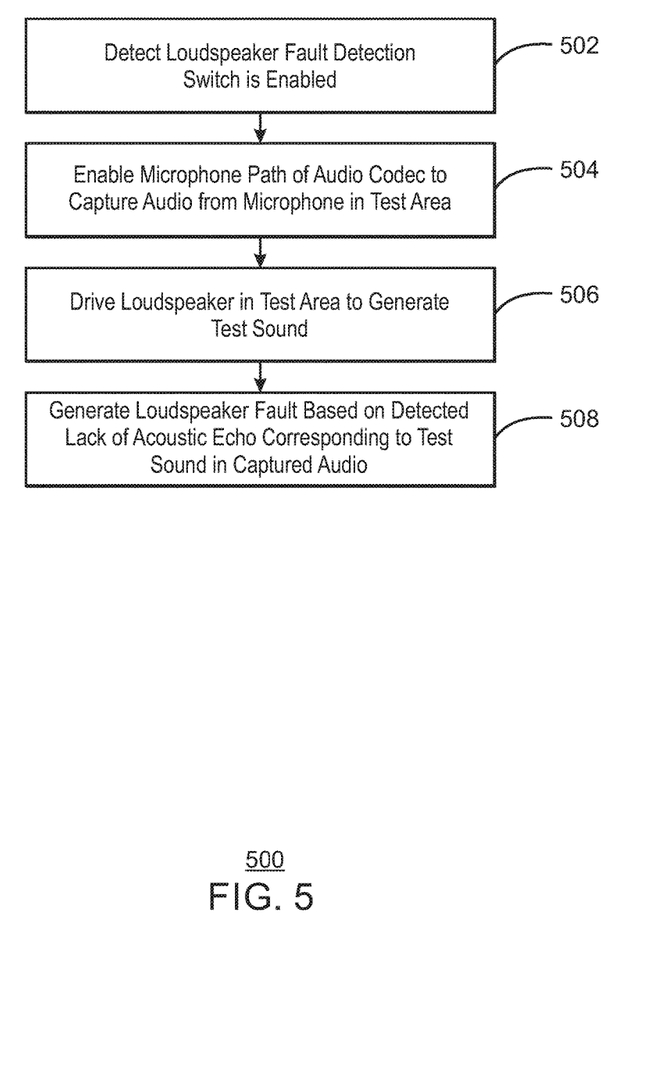
FIG. 5 is a flow chart illustrating a method for testing a system for speaker faults.

FIG. 5 is a flow chart illustrating a method for testing a system for speaker faults. The example method is generally referred to by the reference number 500 and can be implemented in the AEC with LFD feature 138 of system 100 of FIG. 1 or the Extended AEC with LDF 202 of the apparatus 200 of FIG. 2 above or the speaker fault detector 628 of the computing device 600 below.

At block 502, a processor detects that a loudspeaker fault detection switch is enabled. For example, the loudspeaker fault detection switch may have been enabled in response to a test of the loudspeaker being initiated. For example, the test may be periodically initiated in order to detect faults in the loudspeaker. The processor may thus periodically enable the loudspeaker fault detection switch.

At block 504, the processor enables a microphone path of an audio codec to capture audio from a microphone in a test area.

At block 506, the processor drives a loudspeaker in the test area to generate a test sound. In some examples, the test sound may include audio in various frequencies audible to the human ear. For example, the test sound may include audio in a range of frequencies from 20 to 20,000 Hertz.

At block 508, the processor generates a loudspeaker fault based on a detected lack of an acoustic echo corresponding to the test sound in the captured audio. In some examples, the detected lack of an acoustic echo may be based on a comparison of the captured audio with an echo energy threshold. For example, the lack of acoustic echo can be detected in response to determining that no acoustic echo in the captured audio exceeds the echo energy threshold. In some examples, the corresponding speaker causing the loudspeaker fault can then be fixed or replaced.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
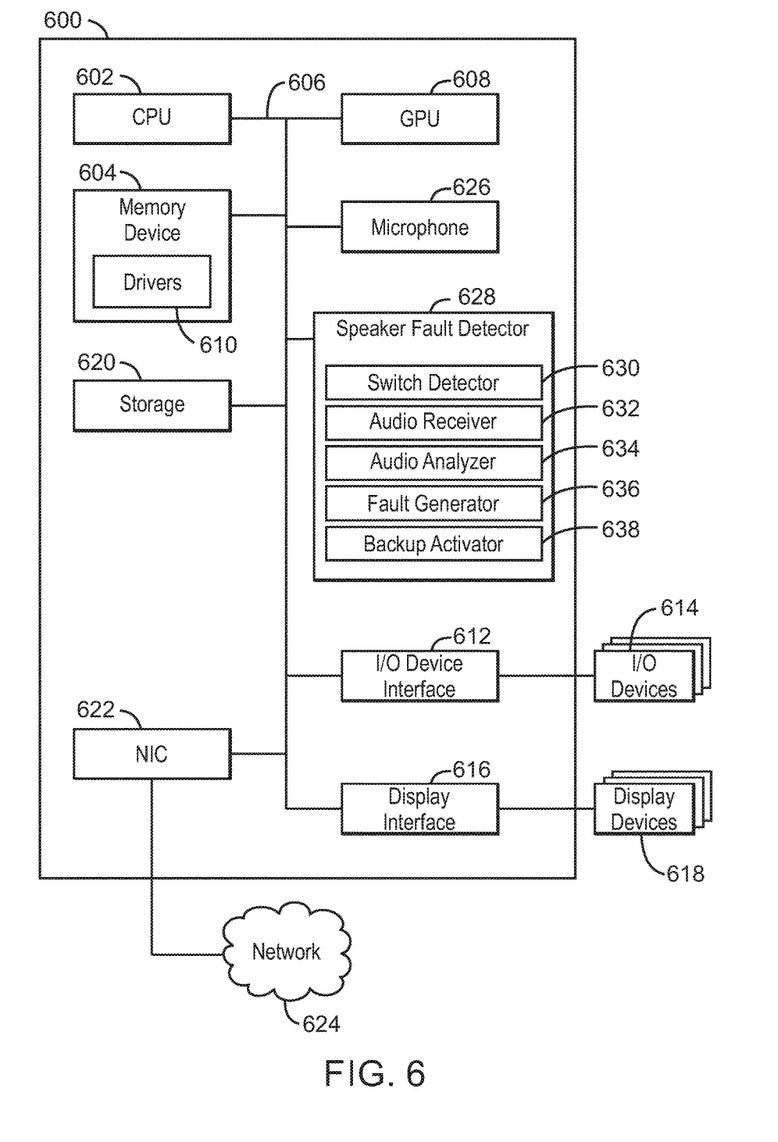
FIG. 6 is block diagram illustrating an example computing device that can detect speaker faults using acoustic echoes.

Referring now to FIG. 6, a block diagram is shown illustrating an example computing device that can detect speaker faults using acoustic echoes. The computing device 600 may be, for example, a laptop computer, desktop computer, tablet computer, mobile device, or wearable device, among others. In some examples, the computing device 600 may be a computer integrated into a vehicle. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for detecting speaker faults. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a microphone 626. For example, the microphone 626 may a single microphone or a microphone array.

The computing device 600 further includes a speaker fault detector 628. For example, the speaker fault detector 628 can be used to detect speaker faults using acoustic echoes. The speaker fault detector 628 can include a switch detector 630, an audio receiver 632, an audio analyzer 634, a fault detector 636, and a backup activator 638. In some examples, each of the components 630-638 of the speaker fault detector 628 may be a microcontroller, embedded processor, or software module. The switch detector 630 can detect that a loudspeaker fault detection switch is enabled. In some examples, the loudspeaker fault detection switch can be enabled in response to detecting an activation of an audible warning system to be tested. In some examples, the loudspeaker fault detection switch can be enabled in response to a periodic automated test. In some examples, the switch detector 630 can enable a microphone path to receive the audio in response to detecting the audible warning system is activated. The audio receiver 632 can receive an echo energy threshold and audio from a microphone in a test area. For example, the microphone may be proximately located to a loudspeaker configured to sound an audible warning. The audio analyzer 634 can detect that the echo energy threshold is not exceeded by an acoustic echo in the captured audio. For example, the acoustic echo may correspond to a test sound used to periodically test a loudspeaker. In some examples, the acoustic echo may correspond to an audible warning from an audible warning system. In some examples, the audio analyzer 634 can also detect that an output channel contains audio. For example, the output channel may be time synced with the detected acoustic echo. The fault detector 636 can generate a loudspeaker fault in response to detecting the acoustic echo does not exceed the echo energy threshold. In some examples, the fault detector 636 can generate the loudspeaker fault in response to detecting the acoustic echo does not exceed the echo energy threshold, that the loudspeaker fault detection switch is enabled, and that an output channel contains audio. The backup activator 638 can activate a backup warning system in response to detecting the loudspeaker fault. For example, the backup system may be a visual warning system or a haptic warning system. In some examples, the backup system may be an automated response system, such as an automated lane change system or automated braking system.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the audio receiver 632, the audio analyzer 634, the fault detector 636, and the backup activator 638, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the speaker fault detector 628 may be implemented with an application specific integrated circuit, in logic implemented in a processor, in logic implemented in a specialized audio processing unit, or in any other device.

Figure 7:
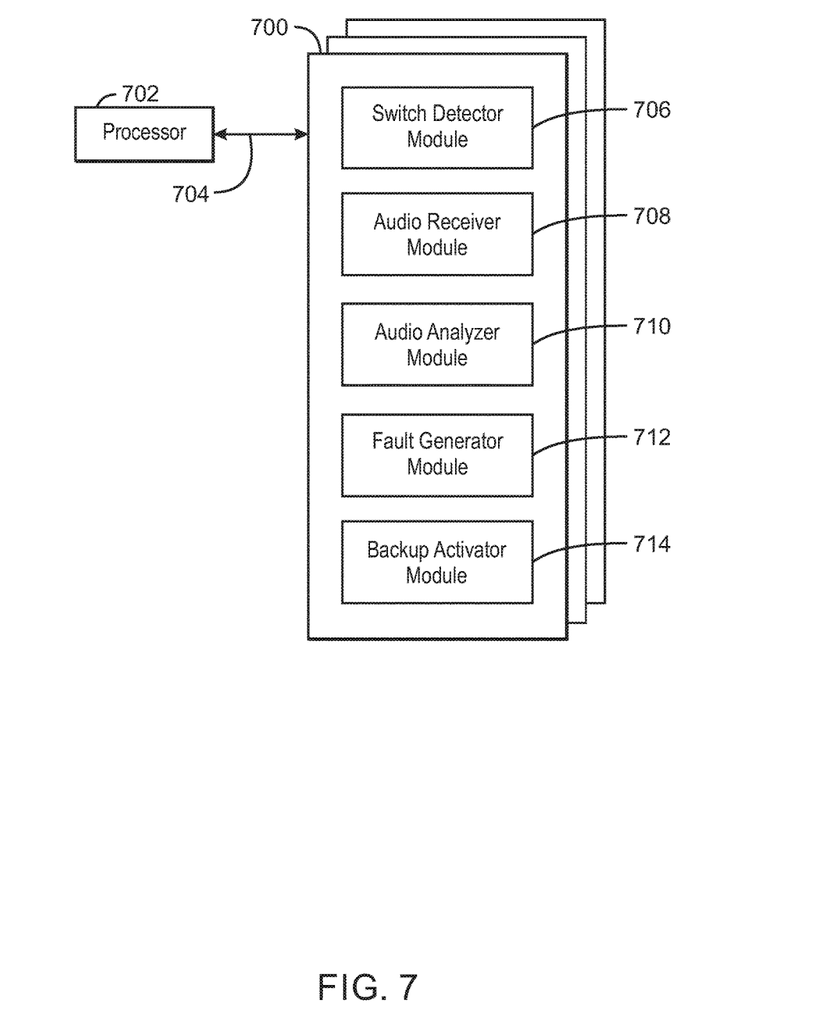
FIG. 7 is a block diagram showing computer readable media that store code for detecting speaker faults using acoustic echoes.

FIG. 7 is a block diagram showing computer readable media 700 that store code for detecting speaker faults using acoustic echoes. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a switch detector module 706 may be configured to detect that a loudspeaker fault detection switch is enabled. In some examples, the switch detector module 706 may be configured to enable a microphone path of an audio codec in response to detecting that the loudspeaker fault detection switch is enabled. For example, the loudspeaker fault detection switch may be enabled in response to detecting an activation of an audible warning system to be tested. In some examples, the loudspeaker fault detection switch can be periodically enabled and a loudspeaker driven to generate a test sound. For example, the acoustic echo may correspond to the test sound. In some examples, the switch detector module 706 may be configured to switch a system to a daily usage mode in response to detecting a disabled loudspeaker fault detection switch. An audio receiver module 708 may be configured to receive audio from a microphone in a test area. For example, the test area may include sound from a loudspeaker to be tested. In some examples, the audio receiver module 708 may cause a test sound to be generated in response to detecting that the loudspeaker switch is enabled. An audio analyzer module 710 may be configured to detect that an acoustic echo in the captured audio does not exceed an echo energy threshold. For example, an acoustic echo may not exceed the echo energy threshold due to noise or not being sounded loud enough. In some example, the audio analyzer module 710 may cause an audible warning to sound in response to detecting that the acoustic echo exceeds the echo energy threshold. In some examples, the audio analyzer module 710 can also detect that an output channel contains audio. For example, the output channel is time synced with a detected acoustic echo. A fault generator module 712 may be configured to generate a loudspeaker fault in response to detecting that the loudspeaker fault detection switch is enabled, that the acoustic echo does not exceed the echo energy threshold, and that an output channel contains audio. A backup activator module 714 may be configured to activate a backup system in response to detecting the loudspeaker fault. For example, the backup activator module 714 may be configured to activate a backup warning system in response to detecting the loudspeaker fault. For example, the backup activator module 714 may be configured to activate a visual warning system or a haptic warning system in response to detecting the loudspeaker fault. In some examples, the up activator module 714 may be configured to activate a backup response system in response to detecting the loudspeaker fault. For example, the backup response system may be an automated lane change system or an automated braking system.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for detecting loudspeaker faults. The apparatus includes a switch detector to detect that a loudspeaker fault detection switch is enabled. The apparatus includes an audio receiver to receive an echo energy threshold and audio from a microphone in a test area. The apparatus includes an audio analyzer to detect that the echo energy threshold is not exceeded by an acoustic echo in the captured audio. The apparatus includes a fault generator to generate a loudspeaker fault in response to detecting the acoustic echo does not exceed the echo energy threshold.

Example 2 includes the apparatus of example 1, including or excluding optional features. In this example, the apparatus includes logic to enable the loudspeaker fault detection switch in response to detecting an audible warning system is activated.

Example 3 includes the apparatus of any one of examples 1 to 2, including or excluding optional features. In this example, the switch detector is to enable a microphone path to receive the audio in response to detecting the audible warning system is activated.

Example 4 includes the apparatus of any one of examples 1 to 3, including or excluding optional features. In this example, the fault generator is to generate the loudspeaker fault in response to detecting the acoustic echo does not exceed the echo energy threshold, that the loudspeaker fault detection switch is enabled, and that an output channel contains audio.

Example 5 includes the apparatus of any one of examples 1 to 4, including or excluding optional features. In this example, the output channel is time synced with the detected acoustic echo.

Example 6 includes the apparatus of any one of examples 1 to 5, including or excluding optional features. In this example, the apparatus includes logic to enable the loudspeaker fault detection switch in response to detecting a test is initiated. The fault generator is to generate a loudspeaker fault in response to detecting the acoustic echo does not exceed the echo energy threshold and the loudspeaker fault detection switch is enabled.

Example 7 includes the apparatus of any one of examples 1 to 6, including or excluding optional features. In this example, the microphone is proximately located to a loudspeaker configured to sound an audible warning.

Example 8 includes the apparatus of any one of examples 1 to 7, including or excluding optional features. In this example, the acoustic echo corresponds to a test sound used to periodically test a loudspeaker.

Example 9 includes the apparatus of any one of examples 1 to 8, including or excluding optional features. In this example, the acoustic echo comprises an audible warning from an audible warning system.

Example 10 includes the apparatus of any one of examples 1 to 9, including or excluding optional features. In this example, the apparatus includes a backup activator to activate a backup system in response to detecting the loudspeaker fault.

Example 11 is a method for detecting loudspeaker faults. The method includes detecting, via a processor, an enabled loudspeaker fault detection switch. The method also includes receiving, via a microphone in a test area, audio. The method further includes detecting, via the processor, an acoustic echo in the captured audio does not exceed an echo energy threshold. The method also further includes generating, via the processor, a loudspeaker fault in response to detecting the acoustic echo does not exceed the echo energy threshold and the loudspeaker fault detection switch is enabled.

Example 12 includes the method of example 11, including or excluding optional features. In this example, receiving the audio comprises enabling, via the processor, a microphone path of an audio codec in response to detecting that the loudspeaker fault detection switch is enabled.

Example 13 includes the method of any one of examples 11 to 12, including or excluding optional features. In this example, the method includes periodically enabling the loudspeaker fault detection switch and driving a loudspeaker to generate a test sound, wherein the acoustic echo corresponds to the test sound.

Example 14 includes the method of any one of examples 11 to 13, including or excluding optional features. In this example, the loudspeaker fault detection switch is enabled in response to detecting activation of an audible warning system.

Example 15 includes the method of any one of examples 11 to 14, including or excluding optional features. In this example, the method includes generating the loudspeaker fault in response to detecting that the acoustic echo does not exceed the echo energy threshold, that the loudspeaker fault detection switch is enabled, and that an output channel contains audio.

Example 16 includes the method of any one of examples 11 to 15, including or excluding optional features. In this example, the method includes switching to a daily usage mode in response to detecting a disabled loudspeaker fault detection switch.

Example 17 includes the method of any one of examples 11 to 16, including or excluding optional features. In this example, the method includes detecting, via the processor, that an output channel contains audio, wherein the output channel is time synced with the detected acoustic echo.

Example 18 includes the method of any one of examples 11 to 17, including or excluding optional features. In this example, the method includes causing an audible warning to sound in response to detecting that the acoustic echo exceeds the echo energy threshold.

Example 19 includes the method of any one of examples 11 to 18, including or excluding optional features. In this example, the method includes activating, via the processor, a visual warning system or a haptic warning system in response to detecting the loudspeaker fault.

Example 20 includes the method of any one of examples 11 to 19, including or excluding optional features. In this example, the method includes activating, via the processor, a backup response system in response to detecting the loudspeaker fault.

Example 21 is at least one computer readable medium for detecting loudspeaker faults having instructions stored therein that. The computer-readable medium includes instructions that direct the processor to detect that a loudspeaker fault detection switch is enabled. The computer-readable medium also includes instructions that direct the processor to receive audio from a microphone in a test area. The computer-readable medium further includes instructions that direct the processor to detect that an acoustic echo in the captured audio does not exceed an echo energy threshold. The computer-readable medium also further includes instructions that direct the processor to generate a loudspeaker fault in response to detecting that the loudspeaker fault detection switch is enabled, that the acoustic echo does not exceed the echo energy threshold, and that an output channel contains audio.

Example 22 includes the computer-readable medium of example 21, including or excluding optional features. In this example, the computer-readable medium includes instructions to enable a microphone path of an audio codec in response to detecting that the loudspeaker fault detection switch is enabled.

Example 23 includes the computer-readable medium of any one of examples 21 to 22, including or excluding optional features. In this example, the computer-readable medium includes instructions to enable the loudspeaker fault detection switch in response to detecting an activation of an audible warning system to be tested.

Example 24 includes the computer-readable medium of any one of examples 21 to 23, including or excluding optional features. In this example, the computer-readable medium includes instructions to activate a visual warning system or a haptic warning system in response to detecting the loudspeaker fault.

Example 25 includes the computer-readable medium of any one of examples 21 to 24, including or excluding optional features. In this example, the computer-readable medium includes instructions to activate a backup response system in response to detecting the loudspeaker fault.

Example 26 includes the computer-readable medium of any one of examples 21 to 25, including or excluding optional features. In this example, the computer-readable medium includes instructions to periodically enable the loudspeaker fault detection switch and driving a loudspeaker to generate a test sound, wherein the acoustic echo corresponds to the test sound.

Example 27 includes the computer-readable medium of any one of examples 21 to 26, including or excluding optional features. In this example, the computer-readable medium includes instructions to generate a test sound in response to detecting that the loudspeaker fault detection switch is enabled.

Example 28 includes the computer-readable medium of any one of examples 21 to 27, including or excluding optional features. In this example, the computer-readable medium includes instructions to detect that an output channel contains audio, wherein the output channel is time synced with the detected acoustic echo.

Example 29 includes the computer-readable medium of any one of examples 21 to 28, including or excluding optional features. In this example, the computer-readable medium includes instructions to switch a system to a daily usage mode in response to detecting a disabled loudspeaker fault detection switch.

Example 30 includes the computer-readable medium of any one of examples 21 to 29, including or excluding optional features. In this example, the computer-readable medium includes instructions to cause an audible warning to sound in response to detecting that the acoustic echo exceeds the echo energy threshold.

Example 31 is a system for detecting loudspeaker faults. The system includes a switch detector to detect that a loudspeaker fault detection switch is enabled. The system includes an audio receiver to receive an echo energy threshold and audio from a microphone in a test area. The system includes an audio analyzer to detect that the echo energy threshold is not exceeded by an acoustic echo in the captured audio. The system includes a fault generator to generate a loudspeaker fault in response to detecting the acoustic echo does not exceed the echo energy threshold.

Example 32 includes the system of example 31, including or excluding optional features. In this example, the apparatus includes logic to enable the loudspeaker fault detection switch in response to detecting an audible warning system is activated.

Example 33 includes the system of any one of examples 31 to 32, including or excluding optional features. In this example, the switch detector is to enable a microphone path to receive the audio in response to detecting the audible warning system is activated.

Example 34 includes the system of any one of examples 31 to 33, including or excluding optional features. In this example, the fault generator is to generate the loudspeaker fault in response to detecting the acoustic echo does not exceed the echo energy threshold, that the loudspeaker fault detection switch is enabled, and that an output channel contains audio.

Example 35 includes the system of any one of examples 31 to 34, including or excluding optional features. In this example, the output channel is time synced with the detected acoustic echo.

Example 36 includes the system of any one of examples 31 to 35, including or excluding optional features. In this example, the system includes logic to enable the loudspeaker fault detection switch in response to detecting a test is initiated. The fault generator is to generate a loudspeaker fault in response to detecting the acoustic echo does not exceed the echo energy threshold and the loudspeaker fault detection switch is enabled.

Example 37 includes the system of any one of examples 31 to 36, including or excluding optional features. In this example, the microphone is proximately located to a loudspeaker configured to sound an audible warning.

Example 38 includes the system of any one of examples 31 to 37, including or excluding optional features. In this example, the acoustic echo corresponds to a test sound used to periodically test a loudspeaker.

Example 39 includes the system of any one of examples 31 to 38, including or excluding optional features. In this example, the acoustic echo comprises an audible warning from an audible warning system.

Example 40 includes the system of any one of examples 31 to 39, including or excluding optional features. In this example, the system includes a backup activator to activate a backup system in response to detecting the loudspeaker fault.

Example 41 is a system for detecting loudspeaker faults. The system includes means for detecting that a loudspeaker fault detection switch is enabled. The system also includes means for receiving an echo energy threshold and audio from a microphone in a test area. The system further includes means for detecting that the echo energy threshold is not exceeded by an acoustic echo in the captured audio. The system also further includes means for generating a loudspeaker fault in response to detecting the acoustic echo does not exceed the echo energy threshold.

Example 42 includes the system of example 41, including or excluding optional features. In this example, the system includes means for enabling the loudspeaker fault detection switch in response to detecting an audible warning system is activated.

Example 43 includes the system of any one of examples 41 to 42, including or excluding optional features. In this example, the system includes means for enabling a microphone path to receive the audio in response to detecting the audible warning system is activated.

Example 44 includes the system of any one of examples 41 to 43, including or excluding optional features. In this example, the means for generating the loudspeaker fault is to generate the loudspeaker fault in response to detecting the acoustic echo does not exceed the echo energy threshold, that the loudspeaker fault detection switch is enabled, and that an output channel contains audio.

Example 45 includes the system of any one of examples 41 to 44, including or excluding optional features. In this example, the output channel is time synced with the detected acoustic echo.

Example 46 includes the system of any one of examples 41 to 45, including or excluding optional features. In this example, the system includes means for enabling a loudspeaker fault detection switch in response to detecting a test is initiated. The means for generating a loudspeaker fault is to generate the loudspeaker fault in response to detecting the acoustic echo does not exceed the echo energy threshold and the loudspeaker fault detection switch is enabled.

Example 47 includes the system of any one of examples 41 to 46, including or excluding optional features. In this example, the microphone is proximately located to a loudspeaker configured to sound an audible warning.

Example 48 includes the system of any one of examples 41 to 47, including or excluding optional features. In this example, the acoustic echo corresponds to a test sound used to periodically test a loudspeaker.

Example 49 includes the system of any one of examples 41 to 48, including or excluding optional features. In this example, the acoustic echo comprises an audible warning from an audible warning system.

Example 50 includes the system of any one of examples 41 to 49, including or excluding optional features. In this example, the system includes means for activating a backup system in response to detecting the loudspeaker fault.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for detecting loudspeaker faults, comprising:
    a switch detector to detect that a loudspeaker fault detection switch is enabled;
    an audio receiver to receive an echo energy threshold and audio from a microphone in a test area;
    an audio analyzer to detect that the echo energy threshold is not exceeded by an acoustic echo in the captured audio;
    a fault generator to generate a loudspeaker fault in response to detecting the acoustic echo does not exceed the echo energy threshold; and
    a backup activator to activate a backup response system comprising an automated braking system or an automated lane change system in response to detecting the loudspeaker fault.

2. The apparatus of claim 1, comprising logic to enable the loudspeaker fault detection switch in response to detecting an audible warning system is activated.

3. The apparatus of claim 2, wherein the switch detector is to enable a microphone path to receive the audio in response to detecting the audible warning system is activated.

4. The apparatus of claim 2, wherein the fault generator is to generate the loudspeaker fault in response to detecting the acoustic echo does not exceed the echo energy threshold, that the loudspeaker fault detection switch is enabled, and that an output channel contains audio.

5. The apparatus of claim 4, wherein the output channel is time synced with the detected acoustic echo.

6. The apparatus of claim 1, comprising logic to enable the loudspeaker fault detection switch in response to detecting a test is initiated, wherein the fault generator is to generate the loudspeaker fault in response to detecting the acoustic echo does not exceed the echo energy threshold and the loudspeaker fault detection switch is enabled.

7. The apparatus of claim 1, wherein the microphone is proximately located to a loudspeaker configured to sound an audible warning.

8. The apparatus of claim 1, wherein the acoustic echo corresponds to a test sound used to periodically test a loudspeaker.

9. The apparatus of claim 1, wherein the acoustic echo comprises an audible warning from an audible warning system.

10. The apparatus of claim 1, comprising a backup activator to activate a backup system in response to detecting the loudspeaker fault.

11. A method for detecting loudspeaker faults, comprising:

detecting, via a processor, an enabled loudspeaker fault detection switch;

receiving, via a microphone in a test area, audio;

detecting, via the processor, an acoustic echo in the captured audio does not exceed an echo energy threshold;

generating, via the processor, a loudspeaker fault in response to detecting the acoustic echo does not exceed the echo energy threshold and the loudspeaker fault detection switch is enabled; and activating, via the processor, a backup response system comprising an automated braking system or an automated lane change system in response to detecting the loudspeaker fault.

12. The method of claim 11, wherein receiving the audio comprises enabling, via the processor, a microphone path of an audio codec in response to detecting that the loudspeaker fault detection switch is enabled.

13. The method of claim 11, comprising periodically enabling the loudspeaker fault detection switch and driving a loudspeaker to generate a test sound, wherein the acoustic echo corresponds to the test sound.

14. The method of claim 11, wherein the loudspeaker fault detection switch is enabled in response to detecting activation of an audible warning system.

15. The method of claim 11, comprising generating the loudspeaker fault in response to detecting that the acoustic echo does not exceed the echo energy threshold, that the loudspeaker fault detection switch is enabled, and that an output channel contains audio.

16. The method of claim 11, comprising switching to a daily usage mode in response to detecting a disabled loudspeaker fault detection switch.

17. The method of claim 11, comprising detecting, via the processor, that an output channel contains audio, wherein the output channel is time synced with the detected acoustic echo.

18. The method of claim 11, comprising causing an audible warning to sound in response to detecting that the acoustic echo exceeds the echo energy threshold.

19. The method of claim 11, comprising activating, via the processor, a visual warning system in response to detecting the loudspeaker fault.

20. At least one non-transitory computer readable medium for detecting loudspeaker faults having instructions stored therein that, in response to being executed on a computing device, cause the computing device to:

detect that a loudspeaker fault detection switch is enabled;

receive audio from a microphone in a test area;

detect that an acoustic echo in the captured audio does not exceed an echo energy threshold;

generate a loudspeaker fault in response to detecting that the loudspeaker fault detection switch is enabled, that the acoustic echo does not exceed the echo energy threshold, and that an output channel contains audio; and activate a backup response system comprising an automated braking system or an automated lane change system in response to detecting the loudspeaker fault.

21. The at least one non-transitory computer readable medium of claim 20, comprising instructions to enable a microphone path of an audio codec in response to detecting that the loudspeaker fault detection switch is enabled.

22. The at least one non-transitory computer readable medium of claim 20, comprising instructions to enable the loudspeaker fault detection switch in response to detecting an activation of an audible warning system to be tested.

23. The at least one non-transitory computer readable medium of claim 20, comprising instructions to activate a visual warning system in response to detecting the loudspeaker fault.

* * * * *